United States Patent [19]

Terada et al.

[11] Patent Number: 5,214,659
[45] Date of Patent: May 25, 1993

[54] LASER DEVICE

[75] Inventors: Mitsugu Terada; Ken Ohmata, both of Chiba; Kazuo Shimazaki, Tokyo; Yasuo Oeda; Yuichiro Terashi, both of Chiba, all of Japan

[73] Assignee: Mitsui Petrochemical Industries, Ltd., Tokyo, Japan

[21] Appl. No.: 604,634

[22] Filed: Oct. 29, 1990

[30] Foreign Application Priority Data

Oct. 30, 1989 [JP] Japan .................. 1-282722
Oct. 30, 1989 [JP] Japan .................. 1-282723

[51] Int. Cl.⁵ .............................. H01S 3/10
[52] U.S. Cl. ...................... 372/20; 372/32; 372/98
[58] Field of Search .......... 372/20, 32, 29, 92, 372/98

[56] References Cited

U.S. PATENT DOCUMENTS 3,914,055 10/1975 Wolga et al. ............ 356/75
4,947,398 8/1990 Yasuda et al. ........... 372/29
4,975,919 12/1990 Amada et al. ............ 372/33

FOREIGN PATENT DOCUMENTS 0341315 11/1989 European Pat. Off. .
1-245584 9/1989 Japan .
WO88-07276 9/1988 World Int. Prop. O. .

OTHER PUBLICATIONS

Voumard, C., "External-cavity-controlled 32-MHz narrow-band cw GaAlAs-diode lasers", Optics Letters, vol. 1, No. 2, Aug. 1977, pp. 61-63.

Primary Examiner—James W. Davie
Attorney, Agent, or Firm—Sherman & Shalloway

[57] ABSTRACT

Angles of inclination of the two wavelength selection elements arranged on an optical path of a laser beam source are varied to make a laser output variable. Light transmitting ranges of the two wavelength selection elements are coincided with each other so as to adjust the light wavelength bands, thereby the laser beam is narrowed without increasing its fineness.

2 Claims, 6 Drawing Sheets

LASER DEVICE

BACKGROUND OF THE INVENTION

This invention relates to a technology which is effective in controlling a resonating wavelength and a resonating output in a laser irradiating device.

A laser beam has some features of a coherent high purity of wavelength and a high output or the like and it is highly expected as a light source capable of irradiating an intensified beam. In recent years, there has been developed a light source device using such a laser beam. Its typical one is a narrow band type excimer laser that is studied as a light source for lithography.

In order to get a laser beam of which band is narrowed, it is necessary to provide a configuration having a wavelength selection device such as a grating, a prism, a birefringent filter and an etalon etc. utilized as a laser resonator.

For a laser medium having a laser gain at a wide band such as an excimer laser or a dye laser, it has been applied to insert one or a plurality of etalons into a laser resonator in order to make a narrow band region.

The etalon is a wavelength selecting element in which multireflection of light and interference phenomenon of light generated between the two reflection films in horizontal orientation having a high degree of flatness are utilized, wherein the first etalon may act as a rough adjusting component for a narrow band and the second etalon may act as one for fine adjusting component. That is, the original laser resonation wavelength is roughly narrowed by the first etalon, for example, and this is further narrowed by the second etalon up to a desired band width and then it is outputted.

In FIG. 6, is indicated a wavelength dependability of transmitting light in a typical etalon. A characteristic of the etalon is designated by a spacing of the transmitting bands and a transmitting band width. The spacing of the transmitting band is defined as a free spectral range (hereinafter called as an FSR) and this is dependent upon a spacing between the reflection films. The transmitting band width is defined as a width of a half ($\frac{1}{2}$) of a peak height in the transmitting band range. Then, a ratio between an FSR and the transmitting band width is called as a fineness (i.e. a fineness=FSR/a transmitting band width) and this is determined by a reflection rate, a degree of parallel and a degree of flatness of the reflection film. The narrow band of the laser beam can be realized by utilizing the two etalons of which FSR and fineness are properly selected.

In case where KrF excimer laser is narrowed for its band width by utilizing the etalon having the aforesaid configuration, the band width is narrowed by about 1/10 of the original laser resonating band region by the first etalon and then the width is narrowed by 1/10 by the second etalon.

In case of the normal laser resonating device, an optospectrum measuring device and an output measuring device or the like are additionally arranged for the aforesaid arrangement and the resonating wavelength and the resonating output were stabilized through a feed-back control on the basis of these measured data. However, it was normally applied to vary a power supply voltage of a laser power supply in order to make a forced control over the resonating output.

To the contrary, in case where the power supply voltage was increased in order to increase the resonating output of laser through the aforesaid technology, in particular, in case of applying gas laser such as KrF excimer laser, deterioration of gas was remarkable and then a reduction of laser output was frequently generated.

In order to accommodate for the reduction of the output of the laser, it was necessary to increase the power supply voltage gradually and finally there was a possibility that the voltage reaches its upper limit value.

In addition, in case of the control over the resonating output under a control of the power supply voltage as described above, it was hard to make a fine adjustment of the output.

In order to get such a band width as one required for the power supply for a lithography, it is necessary to make a narrow transmitting band width of etalon. By this fact, it is necessarily required to increase a fineness, resulting in that a reflection film having a high reflection rate is applied. The reflection film is normally got by a coating of a multi-layer film of dielectric material and in order to increase a reflection rate, it is necessary to increase the number of coating layers. Due to this fact, there arise some problems in which a manufacturing step of the etalon is complicated and its reliability in operation and price are not assured. In addition, if the etalon having a high reflection rate is inserted into the laser resonator, its loss caused by the reflection is increased and the output of the resonated laser beam is decreased.

In turn, under the same transmitting band width, the lower FSR, the lower fineness, resulting in that the reduction of output can be prevented. However, a mere reduction of only FSR causes the light to be leaked out of the transmitting band width adjacent to the central frequency of transmitting beam (that is defined a side band), resulting in producing an inconvenient status.

It is an object of the present invention to enable a control over a laser resonating output to be attained without using any control over a power supply voltage, thereby to enable a prevention of deterioration of gas and fine adjustment of output to be realized and at the same time to realize the narrow band formation without increasing a fineness of etalon used by making a proper design of the etalon.

SUMMARY OF THE INVENTION

In order to accomplish the aforesaid objects, the present invention has the following configuration in the laser control device provided with the first wavelength selection element and the second wavelength selection element.

That is, an inclination angle of the aforesaid first or second wavelength selection element arranged on the optical path of the laser beam is varied.

With this arrangement, it is possible to vary a condition of logical product of an optical transmitting band defined by the aforesaid first wavelength selection element and another optical transmitting band set by the aforesaid second wavelength selection element and thus to perform a control of the high wave value at the optical transmitting characteristic.

As a result, the control over a resonating output of the laser beam similar to the aforesaid optical transmitting feature in particular a fine adjustment of the laser beam can be carried out.

As the wavelength selection element to be used in the present invention, a diffraction grid and a birefringent filter or the like can be used in addition to the etalon and further a combination of the diffraction grid with the etalon or another combination of the birefringent filter and the etalon may also be applicable for application.

As the type of laser beam which is suitable for performing a control over the laser resonating output and a wavelength in accordance with the present invention, there are KrF or ArF excimer laser, alexandrite laser, Ti-sapphire laser and a dye laser or the like.

In accordance with the present invention, it becomes possible to control over a resonating output and a resonating wavelength without being dependent upon a control over a power supply voltage at a laser resonating mechanism.

In addition, there are provided the first wavelength selection element and the second wavelength selection element having a transmitting period and a nontransmitting period as their transmitting characteristics. The laser device is provided by a method wherein a relation of both optical transmitting periods is set such that optical wavelength regions adjoining at least at both sides of the aforesaid specific optical transmitting band region of the second wavelength selection element is coincided with a valley of periods of the first wavelength selection element when the specified optical transmitting band region of the first wavelength selection element is coincided with a specified optical transmitting band region of the second wavelength selection element.

As described above, although the narrow band region is realized without increasing a fineness of the used etalon by making a proper design of the etalon, if the element is the wavelength selection element having a periodic transmitting or non-passing characteristic, it may not be limited to etalon, but any other elements may also be applied. As such the wavelength selection element, the birefringent filter or the like can be applied as an example.

In the present invention, a wavelength periodic characteristic of optical transmitting feature of aforesaid wavelength selection element is utilized and a narrow band region of the laser beam is attained without increasing a fineness than that of the prior art.

That is, the combination of the wavelength selection element to be used in making a narrow band region is one in which when a periodic relation of both optical transmitting of aforesaid first wavelength selection element and the second wavelength selection element becomes a relation having the optical wavelength band region adjoining to both sides of the aforesaid optical transmitting band region of the second wavelength selection element coincided with the periodic valley adjoining to both sides of the aforesaid specific optical transmitting band region of the first wavelength selection element when the specified optical transmitting band region in the first wavelength selection element is coincided with a specific optical transmitting band region of the second wavelength selection element. Accordingly, an optical transmitting is shielded except optical transmitting band regions coincided to each other. Thus, the wavelength selection element having a smaller FSR than that of the prior art can be used. Application of such a combination as above may enable a narrow band region to be attained even at a low fineness. In addition, there is no fear of generating the side band.

According to the present invention, it is possible to perform a high efficient narrow band making of the laser beam though two wavelength selection elements.

DESCRIPTION OF THE PREFERRED EMBODIMENTS

Figure 1A:
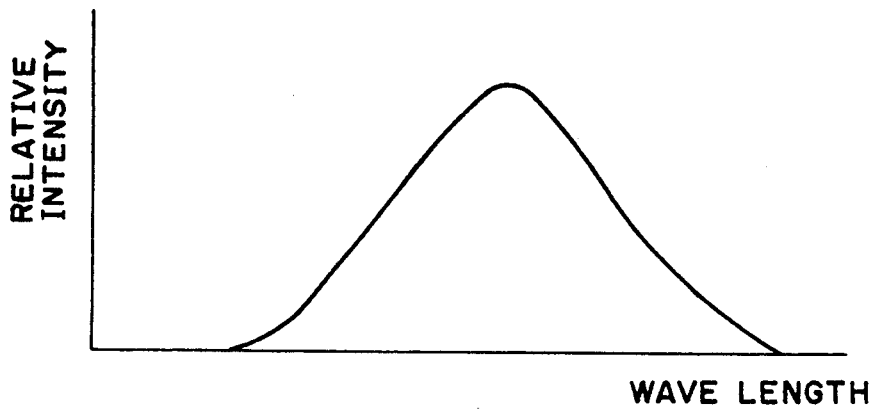
FIGS. 1(a), 1(b) and 1(c) and are graphs for showing a resonating spectrum characteristic and a resonating output characteristic of the preferred embodiment.

EXAMPLE 1:

Referring now to the drawings, one preferred embodiment of the present invention will be described.

Figure 4:
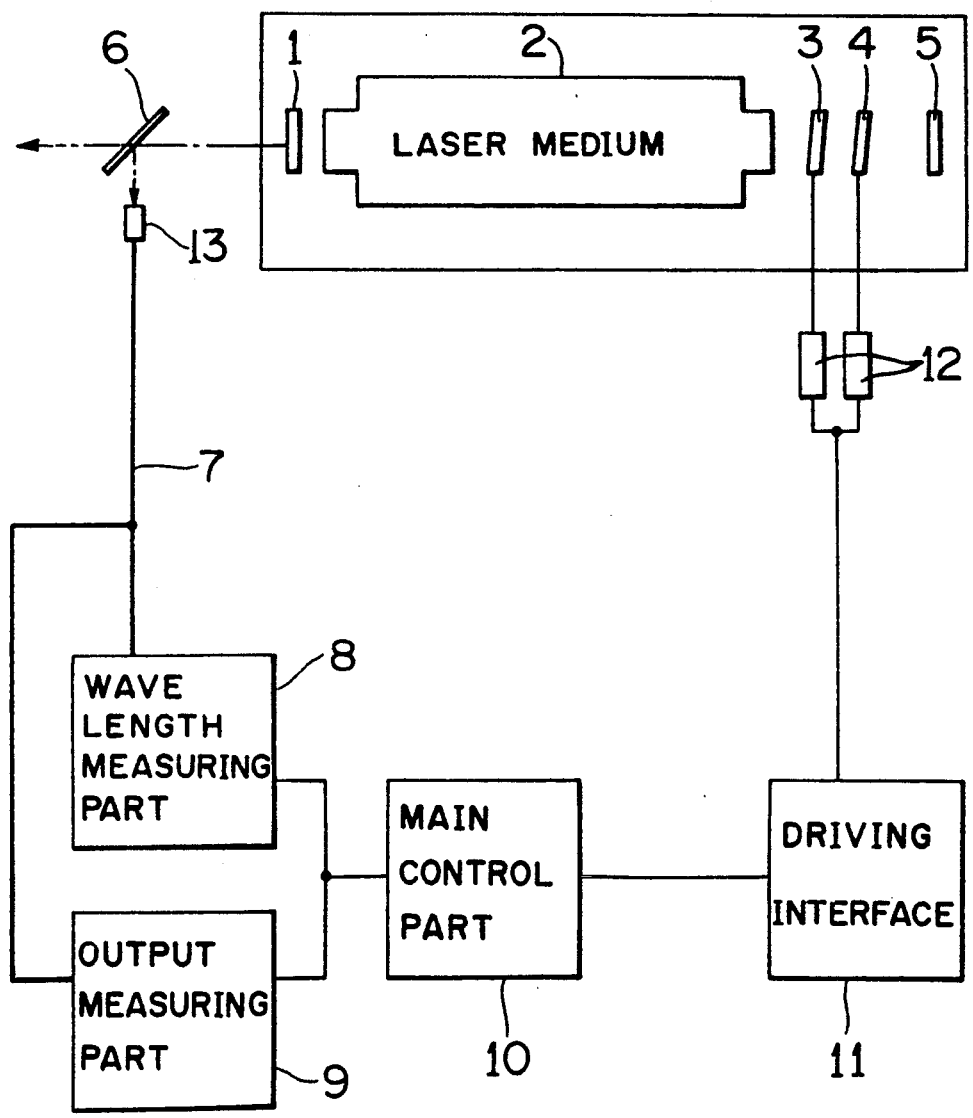
FIG. 4 is a functional block diagram for showing an entire configuration of the laser device.
Figure 5A:
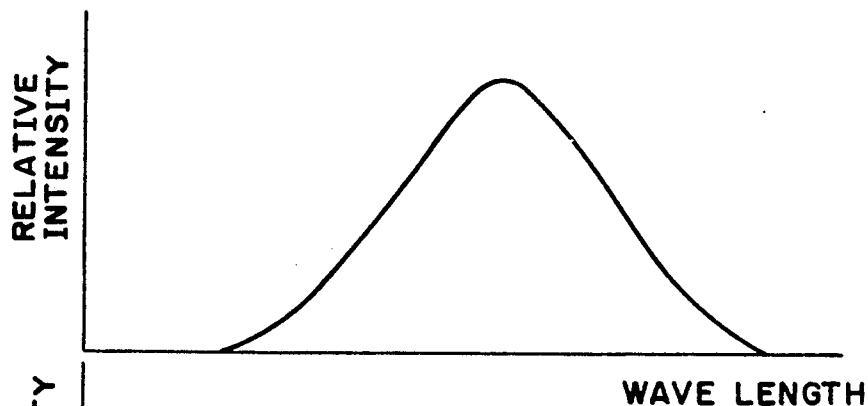
FIGS. 5(a), 5(b), 5(c) and 5(d) illustrate a narrow band forming process of the laser beam in case that a fine adjusting and rough adjusting etalon, wherein 5(a) indicates a resonating spectrum of laser beam having no narrow band region, 5(b) illustrates an optical transmitting characteristic of a rough adjusting etalon, 5(c) illustrates an optical transmitting characteristic of a fine adjusting etalon and 5(d) illustrates a resonating spectrum of the laser beam narrow banded.
Figure 5B:
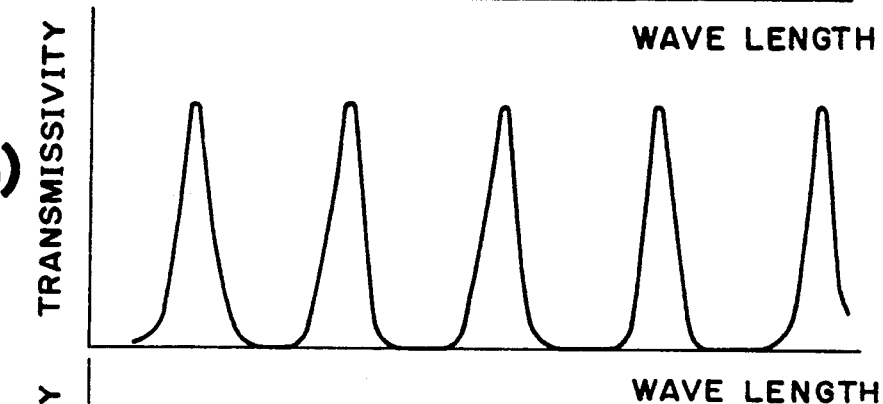
Figure 5C:
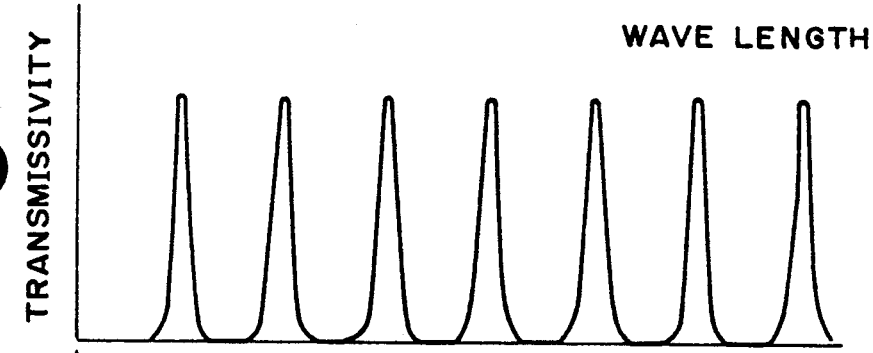
Figure 5D:
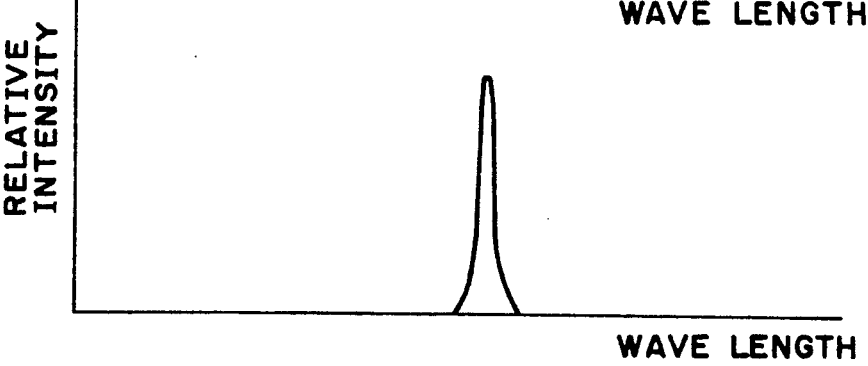

As shown in FIG. 4, an output mirror 1 is arranged at one end outer side of a laser medium 2, and each of a fine adjusting etalon 3 and a rough adjusting etalon 4 is arranged at the other end outer side of the laser medium. A full reflection mirror 5 is arranged at the outermost side and a laser beam generated by the laser medium 2 is reflected by the full reflection mirror 5, thereafter the laser beam is narrow banded to a wavelength band region of about 1/10 by the rough adjusting etalon 4 and thus it is further narrow banded to its 1/10 by the fine adjusting etalon 3 and finally the laser beam is radiated out through the output mirror 1.

In this case, inclinations angles of the fine adjusting etalon 3 and the rough adjusting etalon 4 can be varied by the actuators 12a and 12b, respectively.

The radiated laser beam is branched at its optical path by the beam splitter 6 arranged on the optical path, a part of the laser beam is incident to the wavelength measuring part 8 and the output measuring part 9 through the light receiving element 13 and the optical fiber cable 7, its resonating wavelength and the resonating output are measured, thereafter the measured signals are sent out to the main control part 10. The main control part 10 is provided with a processor, a memory and an external memory means or the like, performs a predetermined calculation in response to the measured signals from the aforesaid wavelength measuring part 8 and the output measuring part 9 and then outputs the control signal to the driving interface 11. To this driving interface 11 are connected actuators 12a and 12b so as to drive the aforesaid fine adjusting etalon 3 and the rough adjusting etalon 4, thereby the inclination angels of these etalons are varied on the optical path of the laser beam.

Then, a method for controlling the resonating wavelength and the resonating output of the laser beam by using the aforesaid laser device will be practically described.

Figure 1B:
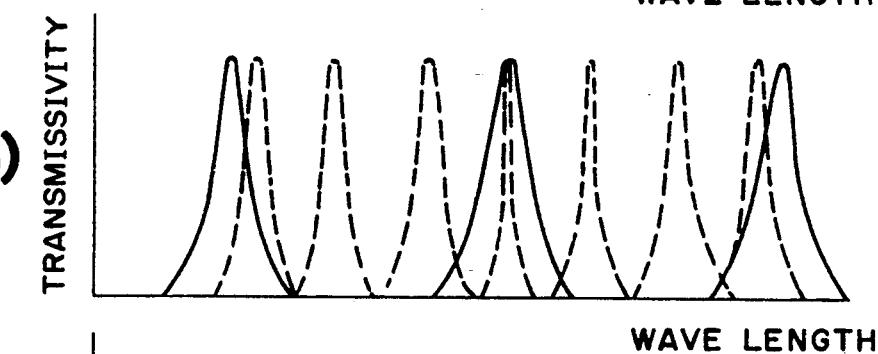
Figure 1C:
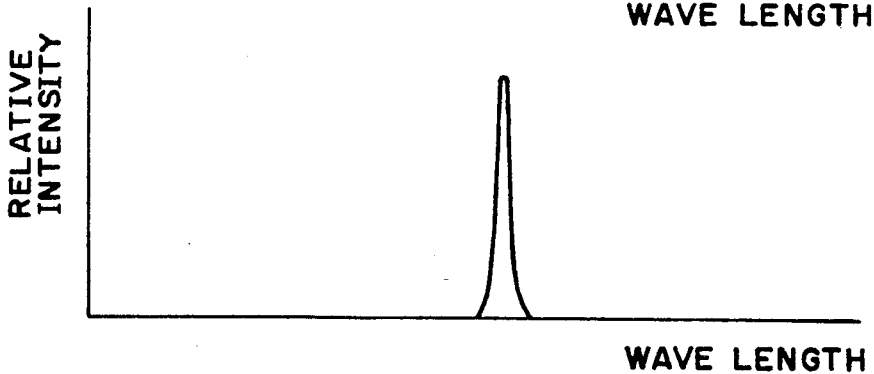

FIG. 1(a) shows a resonating spectrum of not-yet processed laser beam generated by the aforesaid laser medium 2, FIG. 1(b) indicates a light transmitting feature of the fine adjusting etalon 3 (indicated by a dotted line) and a light transmitting characteristic of the rough adjusting etalon 4 (indicated by a solid line). These systems will be described in detail. In case where the laser medium 2 has a gain within a relative wide band region as shown in FIG. 1(a), an intensity distribution (a resonating output) of the radiated laser beam in respect to the wavelength is analogous to a distribution of optical transmitting rate of the etalon under an insertion of the optical element such as a etalon having a specified distribution of the transmitting light rate (FIG. 1(b)). In the preferred embodiment, the narrow band laser beam under a coincident condition (a condition of logical product) of the fine adjusting etalon 3 and the rough adjusting etalon 4 is produced and radiated (FIG. 1(c)).

In this case, when the resonating wavelength is controlled, the fine adjusting etalon 3 is driven to vary the inclination angle and to select a desired wavelength. This is due to the fact that a light transmitting band range of fine controlling etalon 3 is further narrowed and is superior in its wavelength selection characteristic.

Figure 2:
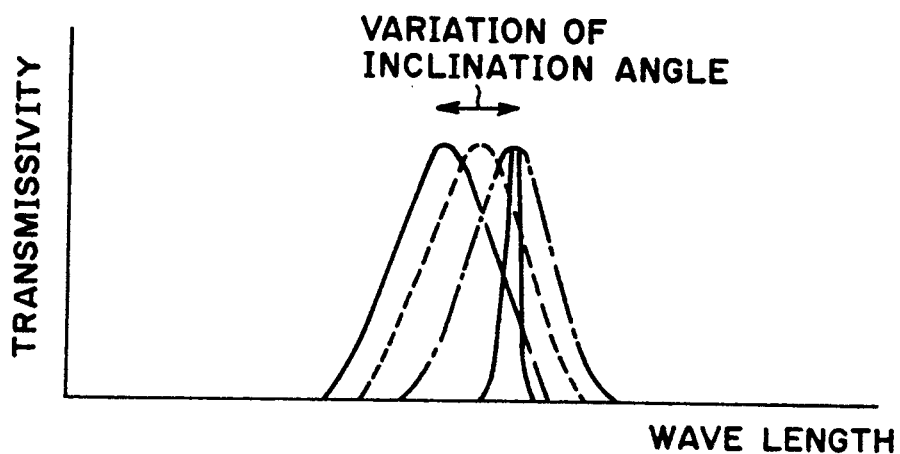
FIG. 2 is a graph for illustrating a variation of an inclination angle.

Then, in case of controlling the resonating output, the rough adjusting etalon 4 is driven and an inclination angle in respect to the optical path is varied while the aforesaid fine adjusting etalon 3 is being fixed (FIG. 2).

That is, a peak value of the light transmitting band range of the rough adjusting etalon 4 in respect to the peak wavelength of the light transmitting band range of the fixed fine adjusting etalon 3 is varied, thereby it is possible to vary the light transmitting rate under a gradient of the light transmitting band range of rough adjusting etalon 3.

Figure 3:
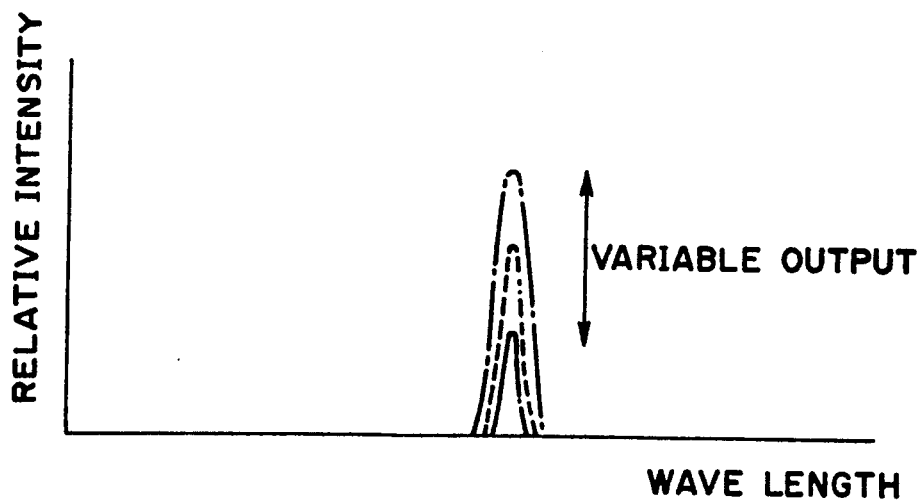
FIG. 3 is a graph for indicating a output control state got through the variation of the inclination angle.

As already described, a variation of this light transmitting rate characteristic is analogues to a resonating output characteristic. Accordingly, as shown in FIG. 3, it is possible to control a resonating output of a laser beam radiated under a driving operation of the rough adjusting etalon 4. In particular, in the preferred embodiment, since the continuous movement of the wavelength of a relative gradual light transmitting gradient through the rough adjusting etalon 4 is utilized to control the resonating output, it becomes possible to make a fine output adjustment and the present invention can be applied for an exposing step in an ultra-fine projecting exposure light in a semiconductor device manufacturing process. In addition, such a mechanism may sufficiently realized by applying an actuator technology of the present electrical, pneumatic and hydraulic mechanism and the present invention may have some advantages of capable of performing a control over the resonating output only with an addition of the relative simple mechanism.

Further, since the control over the resonating output can be realized without being dependent upon the control over the power supply voltage, a deterioration of gas caused by an increased power supply voltage is restricted and then a long life of the laser resonating mechanism in case of using the gas laser can be realized.

In the preferred embodiment, a diffraction grid may also be used in lieu of the rough adjusting etalon. In case of using the alexandrite laser and a dye laser or the like, a birefringent filter may also be used.

In addition, as regards the etalon, more than three etalons may be used as desired.

EXAMPLE 2

A device for narrowing band of laser including a fine adjusting etalon 3 and a rough adjusting etalon 4

As shown in FIG. 5(a), 5(b), 5(c) and 5(d), each of the fine adjusting etalon 3 and the rough adjusting etalon 4 has a light passing characteristic. A part of the laser resonating wavelength range is selected by the rough adjusting etalon 4 and further it is metered into a desired band range by the fine adjusting etalon 3.

Then, when one of the band region (a mountain part) showing high transmitting of light of rough adjusting etalon 4 is coincided with one of the band region (a mountain part) of a high transmitting of light of the rough adjusting etalon 3, the rough adjusting etalon 4 and the fine adjusting etalon 3 are designed in such a way as one band range (a mountain part) of high transmitting of etalon 3 appearing in the resonating range of laser is coincided with the other band range (a valley) of a low transmitting of etalon.

With such an arrangement as above, it is possible to use the rough adjusting etalon 4 having a smaller FSR than that of the prior art. Under an application such a combination of the etalons as described above, it is possible to realize a narrow band range even at a low fineness.

The generated light is reciprocated and reflected between the output mirror 1 and the full reflecting mirror 5, amplified by the laser medium during its movement and then a laser beam of a stable wave having a specified wavelength is produced. Although one laser beam having one wavelength is not resonated, but the laser beams having some wavelengths are simultaneously resonated frequently, in the preferred embodiment, the laser beam is resonated only at a specified wavelength under a presence of the narrow band making elements 3 and 4.

The narrow band range system using a combination of such wavelength selection elements (etalons) can be used for an excimer laser, a dye laser, an alexandrite laser and Ti-sapphire laser or the like.

Arrangement of the fine adjusting etalon 3 and the rough adjusting etalon 4 may be reversed as viewed in the FIGURES.

Figure 6A:
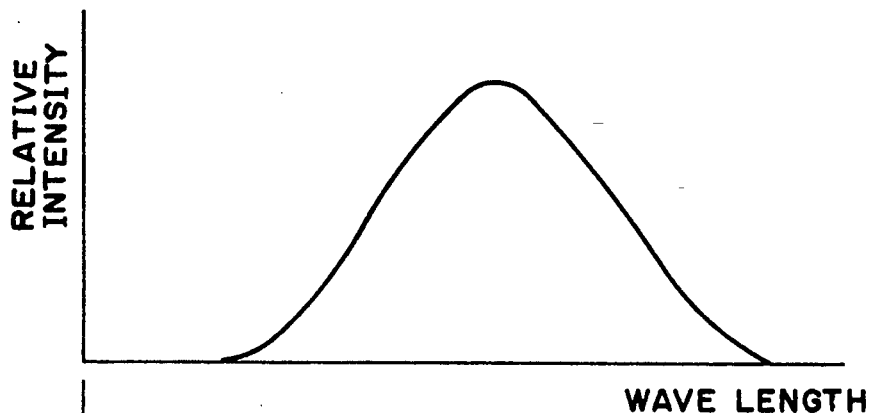
FIGS. 6(a), 6(b) and 6(c) illustrate a narrow band region making process for the laser beam by applying two etalons of the prior art, in which 6(a) shows a resonating spectrum of the laser beam of which band is not narrowed, 6(b) illustrates an optical transmitting feature of a rough adjusting etalon, 6(c) indicates an optical passing characteristic of a fine adjusting etalon and 6(d) indicates a resonating spectrum of laser beam in which a shaded portion is narrow banded.
Figure 6B:
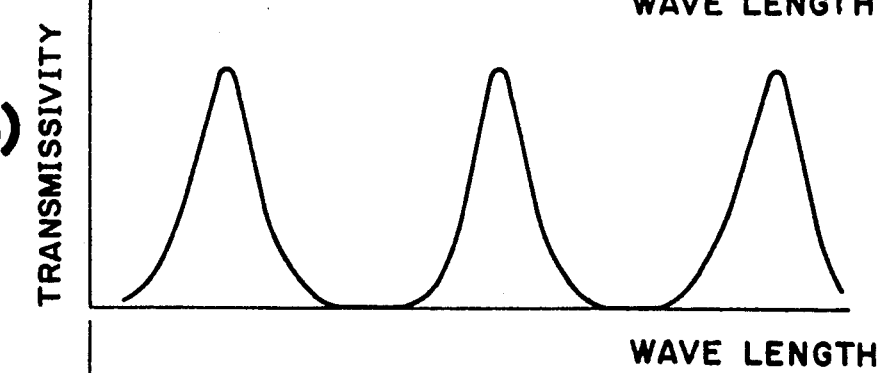
Figure 6C:
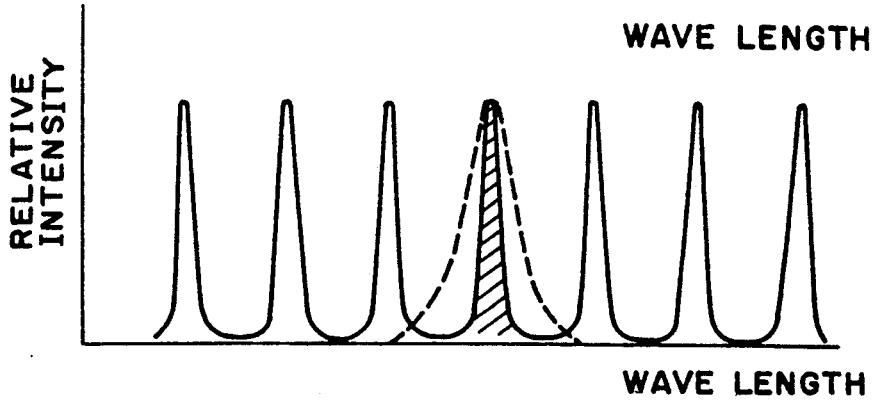
Figure 7:
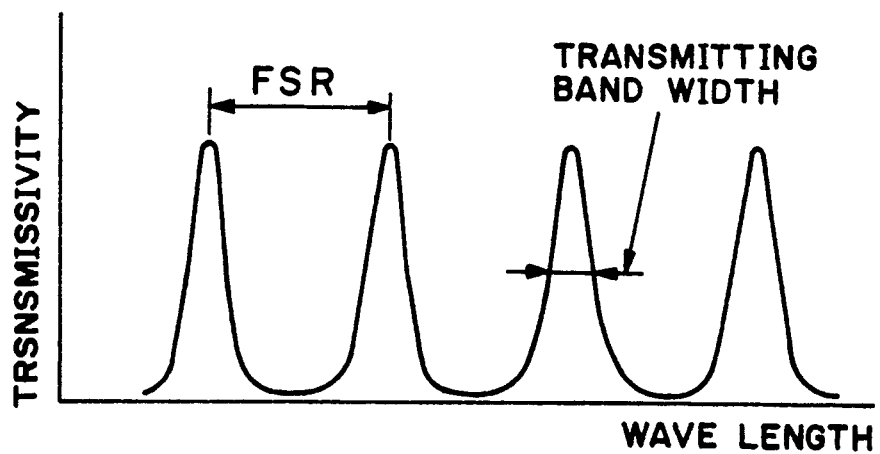
FIG. 7 is an illustration for showing a wavelength dependency of a typical optical transmitting characteristic of etalon.

In FIG. 6 is illustrated a light transmitting characteristic of the prior art etalon. The prior art system is provided with the rough adjusting etalon and the fine adjusting etalon. However, the FSR of the rough adjusting etalon is required to have a half of the resonating band width of the laser not narrowed in its band.

Comparing FIG. 5(a), 5(b), 5(c) and 5(d) to FIG. 6(a), 6(b) and 6(c) shows that even if the same fine adjusting etalon is used, the FSR of the rough adjusting etalon 4 in FIG. 4 can be made half of the process of the present invention. A half value of the FSR means that the half finenes is sufficient for getting the same transmitting band width. This means that a reflection rate of the reflection film in the etalon is reduced. That is, it becomes possible to eliminate the manufacturing of the etalon and further to improve a reliability of the etalon. A loss of transmitting light is reduced and it is possible to restrict a degree of reduction of the laser resonating output.

In the preferred embodiment, the narrow band formation of the laser beam is carried out only with the first and second wavelength selection elements and it may also be applicable that in addition of the first and second wavelength selection elements, either the third or fourth wavelength selection element is overlapped to them to make a narrow band formation of the laser beam.

What is claimed is:

1. A device for narrowing band of laser including a first wavelength selection element and a second wavelength selection element arranged in series on an optical path so as to make a narrow band laser beam from a laser beam source in which the narrow beam laser beam is outputted, wherein said first wavelength selection element and said second wavelength selection element having a transmitting period and a nontransmitting period as their transmitting characteristics, respectively, characterized in that a relation of both light transmitting periodic characteristics is one in which when a specified light transmitting range of the first wavelength selection element is coincided with a specified light transmitting range of the second wavelength selection element, a valley part of the period of the first wavelength selection element adjoining to both of said specified light transmitting regions is coincided with the light wavelength regions of the second wavelength selection element adjoining to at least both sides of said specified light transmitting region, a peak of the light transmitting band range of the one element in respect to the peak wavelength of the light transmitting band range of the fixed fine adjusting another element is varied in direction of wavelength so as to vary the laser output.

2. A laser device including a first wavelength selection element and a second wavelength selection element arranged in series on an optical path so as to make a narrow band laser beam from a laser beam source in which the narrow beam laser beam is outputted, wherein said first wavelength selection element and said second wavelength selection element having a transmitting period and a nontransmitting period as their transmitting characteristics, respectively, characterized in that a relation of both light transmitting periodic characteristics is one in which when a specified light transmitting range of the first wavelength selection element is coincided with a specified light transmitting range of the second wavelength selection element, a valley part of the period of the first wavelength selection element adjoining to both of said specified light transmitting regions is coincided with the light wavelength regions of the second wavelength selection element adjoining to at least both sides of said specified light transmitting region, a peak of the light transmitting band range of the one element in respect to the peak wavelength of the light transmitting band range of the fixed fine adjusting another element is varied in the direction of wavelength so as to vary the laser output.

* * * * *